United States Patent
Wang et al.

(10) Patent No.: US 9,904,255 B2
(45) Date of Patent: Feb. 27, 2018

(54) WEARABLE ELECTRONIC DEVICE AND EVENT-INTIMATING METHOD OF THE SAME

(71) Applicant: HTC Corporation, Taoyuan (TW)

(72) Inventors: Chieh-Kai Wang, Taoyuan (TW); Chin-Wei Chou, Taoyuan (TW); Sung-Ting Hsieh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 110 days.

(21) Appl. No.: 14/857,795

(22) Filed: Sep. 17, 2015

(65) Prior Publication Data

US 2016/0085216 A1    Mar. 24, 2016

Related U.S. Application Data

(60) Provisional application No. 62/052,485, filed on Sep. 19, 2014.

(51) Int. Cl.
G04C 21/32    (2006.01)
G04G 21/04    (2013.01)
(Continued)

(52) U.S. Cl.
CPC .......... *G04G 21/04* (2013.01); *G04C 17/0091* (2013.01); *G04C 21/32* (2013.01); *G04G 13/026* (2013.01); *G06Q 10/00* (2013.01)

(58) Field of Classification Search
CPC ...... G04G 21/04; G04G 21/08; G04G 13/026; G04B 17/0091; G04C 21/32; G06Q 10/00
See application file for complete search history.

(56) References Cited

U.S. PATENT DOCUMENTS 8,902,715 B2 * 12/2014 Tu .................. G04G 21/08
                                               368/223
9,176,480 B2 * 11/2015 Sadilek .............. G06F 3/04886
(Continued)

FOREIGN PATENT DOCUMENTS

CN    1575442 A    2/2005
CN    203606632 U    5/2014

OTHER PUBLICATIONS

Corresponding Taiwanese Office Action that these art references were dated Jun. 8, 2016.

*Primary Examiner* — Sean Kayes
(74) *Attorney, Agent, or Firm* — CKC & Partners Co., Ltd.

(57) ABSTRACT

A wearable electronic device is provided. The wearable electronic device includes a wireless communication unit, a processing unit, a watch interface and a display unit. The wireless communication unit performs wireless communication with a portable electronic device. The processing unit synchronizes with the portable electronic device to retrieve event data from the portable electronic device through the wireless communication unit, wherein the event data comprises a plurality of events and time information corresponding to the events. The watch interface has a dial. The processing unit controls the display unit to display a color bar surrounding the dial, wherein the color bar includes a plurality of sections to display durations of the events based on the time information. When the processing unit determines that a time-based condition or a location-based condition of the events is met, an intimating signal is generated under the control of the processing unit.

18 Claims, 4 Drawing Sheets

(51) Int. Cl.
*G04C 17/00* (2006.01)
*G04G 13/02* (2006.01)
*G06Q 10/00* (2012.01)

(56) References Cited

U.S. PATENT DOCUMENTS

| | | | |
|---|---|---|---|
| 9,557,881 B1* | 1/2017 | Jain | G06F 3/0481 |
| 2008/0081594 A1* | 4/2008 | Lee | H04M 1/72566 |
| | | | 455/412.2 |
| 2011/0143720 A1 | 6/2011 | Sanjeev | |
| 2011/0157046 A1* | 6/2011 | Lee | G04G 21/08 |
| | | | 345/173 |
| 2013/0058198 A1* | 3/2013 | Tu | G04G 21/08 |
| | | | 368/28 |
| 2014/0243021 A1* | 8/2014 | Lerenc | H04W 4/027 |
| | | | 455/456.3 |

\* cited by examiner

WEARABLE ELECTRONIC DEVICE AND EVENT-INTIMATING METHOD OF THE SAME

RELATED APPLICATIONS

This application claims priority to Provisional Application Ser. No. 62/052,485, filed Sep. 19, 2014, which is herein incorporated by reference.

BACKGROUND

Field of Invention

The present invention relates to an event-intimating technology. More particularly, the present invention relates to a wearable electronic device and an event-intimating method of the same.

Description of Related Art

Recently, watches and other wearable devices have begun to offer functions beyond simple display of the time. For example, some watches have incorporated keyboards and offer the ability to store and retrieve information such as addresses and phone numbers. Nevertheless, there is no efficient intimating mechanism to remind the user about the event such as the time that the event starts or the duration of time period of the event implemented on the wearable devices.

Accordingly, what is needed is a wireless power transmitter device and a wireless power receiver device to address the above issues.

SUMMARY

The invention provides a wearable electronic device. The wearable electronic device includes a wireless communication unit, a processing unit, a watch interface and a display unit. The wireless communication unit performs wireless communication with a portable electronic device. The processing unit synchronizes with the portable electronic device to retrieve event data from the portable electronic device through the wireless communication unit, wherein the event data comprises a plurality of events and time information corresponding to the events. The watch interface has a dial. The processing unit controls the display unit to display a color bar surrounding the dial, wherein the color bar includes a plurality of sections to display durations of the events based on the time information. When the processing unit determines that a time-based condition or a location-based condition of the events is met, an intimating signal is generated under the control of the processing unit.

Yet another aspect of the present invention is to provide an event-intimating method used in a wearable electronic device. The event intimating method includes the steps outlined below. A wireless communication with a portable electronic device is performed by a wireless communication unit. The portable electronic device is synchronized with by a processing unit to retrieve event data from the portable electronic device through the wireless communication unit, wherein the event data comprises a plurality of events and time information corresponding to the events. A display unit is controlled for displaying a color bar surrounding a dial of a watch interface by the processing unit, wherein the color bar includes a plurality of sections to display durations of the events based on the time information. A time-based condition or a location-based condition of the events is determined to be met by the processing unit. An intimating signal is generated under the control of the processing unit.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
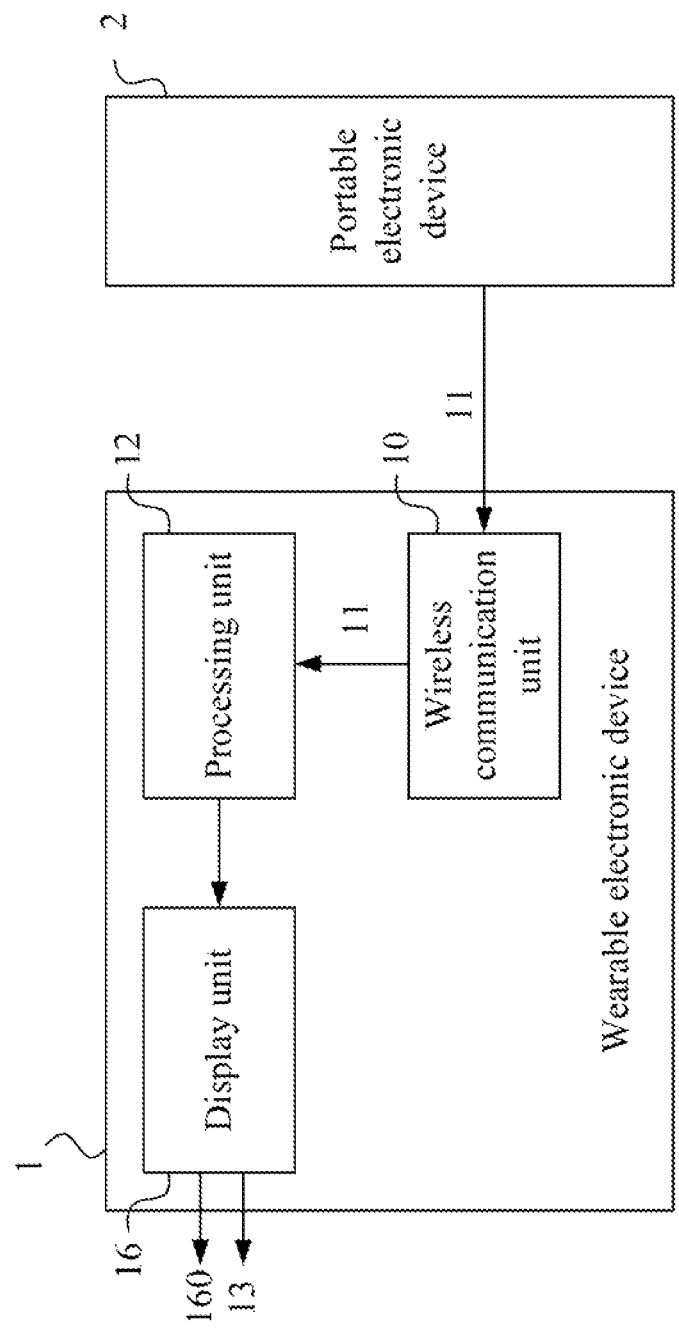
FIG. 1 is a block diagram of a wearable electronic device and a portable electronic device in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2A:
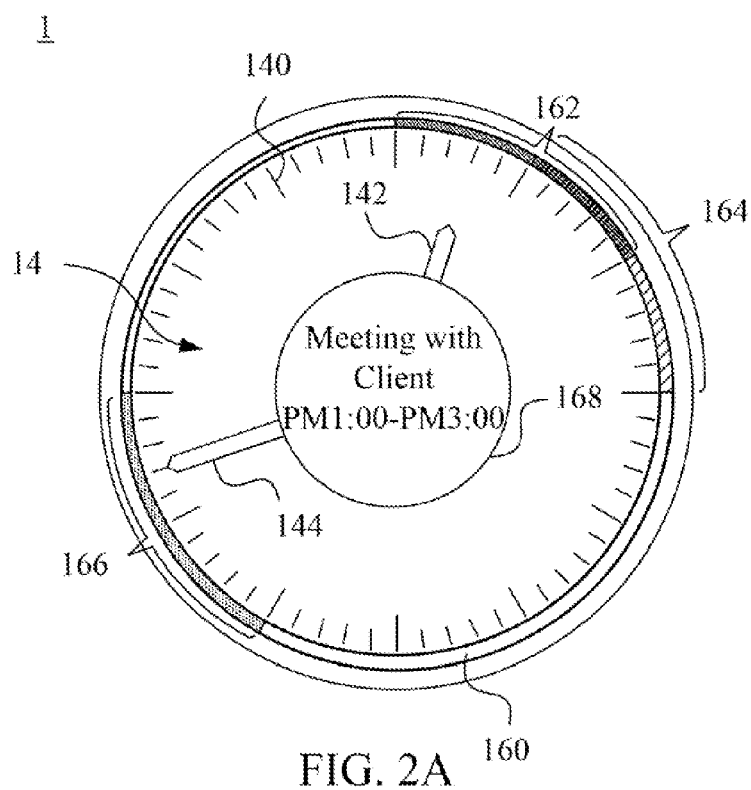
FIG. 2A is a three dimensional diagram of the wearable electronic device in an embodiment of the present invention.

Reference is now made to FIG. 1 and FIG. 2A at the same time. FIG. 1 is a block diagram of a wearable electronic device 1 and a portable electronic device 2 in an embodiment of the present invention. FIG. 2A is a three dimensional diagram of the wearable electronic device 1 in an embodiment of the present invention.

In an embodiment, the wearable electronic device 1 can be any electronic device that can be put on a user, such as but not limited to a watch and an electronic bracelet. The portable electronic device 2 can be any electronic device such as but not limited to a smartphone and a tablet personal computer. The wearable electronic device 1 is able to perform wireless communication with the portable electronic device 2 to synchronize the data from the portable electronic device 2.

The wearable electronic device 1 includes a wireless communication unit 10, a processing unit 12, a watch interface 14 (illustrated in FIG. 2) and a display unit 16.

The wireless communication unit 10 performs wireless communication with the portable electronic device 2. The wireless communication can be performed in the form of such as, but not limited to WiFi and Bluetooth.

The processing unit 12 synchronizes with the portable electronic device 1 to retrieve event data 11 from the portable electronic device 2 through the wireless communication unit 10. The event data 11 includes a plurality of events and time information corresponding to the events. In an embodiment, the events are calendar events that specify the events in the schedule of the user and the time information includes such as, but not limited to the start time, the end time and the date of the events. For example, a first event is an appointment with the user's family members and the time information includes PM 12:00 to PM 2:00, Sep. 26, 2015. A second event is a meeting with the user's client and the time information includes PM 1:00 to PM 3:00, Sep. 26, 2015. A third event is a sports game that the user is going to watch and the time information includes PM 7:00 to PM 9:00, Sep. 26, 2015.

The watch interface 14 has a dial 140, in which the dial 140 can be numbered such as, but not limited to 1 through 12. In an embodiment, the watch interface 14 is an analog interface and the watch interface 14 may further include such as, but not limited to an hour hand 142 and a minute hand 144 to indicate the time based on the positions of these hands relative to the dial 140. In an embodiment, the watch interface 14 can be a composite interface in which the dial 140 can be in a digital form displayed by such as, but not limited to the display unit 16, and the hands mentioned above can be in the analog form.

The display unit 16 can be such as, but not limited to a liquid crystal display unit. The display unit 16 can be a panel fully occupying the watch interface 14 or can be separated into two parts, in which one part is disposed at the center of the watch interface 14 and the other part surrounds the dial 140.

The processing unit 12 controls the display unit 16 to display a color bar 160 surrounding the dial 140, as illustrated in FIG. 2. The color bar 160 includes a plurality of sections, such as but not limited to the sections 162, 164 and 166.

The sections 162, 164 and 166 display durations of the events based on the time information. For example, the section 162 displays the duration of the first event mentioned above, in which the duration is PM 12:00 to PM 2:00 based on the corresponding time information. The section 164 displays the duration of the second event mentioned above, in which the duration is PM 1:00 to PM 3:00 based on the corresponding time information. The section 166 displays the duration of the third event mentioned above, in which the duration is PM 7:00 to PM 9:00 based on the corresponding time information.

In an embodiment, an intimating signal 13 is generated under the control of the processing unit 12 to intimate the user when the processing unit 12 determines that a time-based condition or a location-based condition of the events is met.

For example, the time-based condition is met when the processing unit 12 determines that the durations of the events, such as the events corresponding to the sections 162 and 164 are overlapped, the intimating signal 13 is generated under the control of the processing unit 12 to intimate the user about the event-overlapped condition.

In another example, the time-based condition is met when the processing unit 12 determines the time meets the start time of one of the events, such as the time of PM 7:00, Sep. 26, 2015 corresponding to the sports game mentioned above, the intimating signal 13 is generated under the control of the processing unit 12 to intimate the user about the occurrence of the event.

In yet another example, the time-based condition is met when the processing unit 12 determines the time meets a predetermined time prior to the occurrence of one of the events, such as the time of PM 6:00, Sep. 26, 2015 prior to an hour of the sports game mentioned above, the intimating signal 13 is generated under the control of the processing unit 12 to intimate the user about the upcoming event.

In yet another example, the location-based condition is met when the processing unit 12 determines the location of the wearable electronic device 1 is within a predetermined distance from a geometrical spot related to an event, such as within 1 kilometer from the geometrical of the sports game mentioned above, the intimating signal 13 is generated under the control of the processing unit 12 to intimate the user about the geometrical information of the event. In a practical application, the event can be a navigation event when a user wants to find a desired destination.

It is appreciated that the location of the wearable electronic device 1 and the distance mentioned above can be determined based on a positioning unit (not illustrated) using any possible positioning technology implemented in the wearable electronic device 1.

The embodiments of the generation of the intimating signal 13 is described in detail below.

In a first embodiment, the processing unit 12 controls the display unit 16 to make the color bar 160 blink to generate the intimating signal 13. In an embodiment, the processing unit 12 controls the display unit 16 such that at least one of the sections of the corresponding events blinks to generate the intimating signal 13.

For example, when the sections 162 and 164 are overlapped, the processing unit 12 controls the display unit 16 to make either both of the sections 162 and 164 blink or only the overlapped part of the sections 162 and 164 blink.

In another example, when the event corresponding to the section 164 occurs, the event corresponding to the section 164 is about to occur after an hour, or the geometrical spot of the event corresponding to the section 164 is within 1 kilometer from the location of the wearable electronic device 1, the processing unit 12 controls the display unit 16 to make the section 164 blink.

In an embodiment, when the time or the position to the event is closer, the processing unit 12 may increase the blinking frequency to perform a further intimation.

In a second embodiment, the processing unit 12 controls the display unit 16 to display an intimating frame 168 thereon to generate the intimating signal 13. The intimating frame may include such as, but not limited to the a content, a name, a duration, a start time, an end time, a location or a combination of the above of the events.

For example, when the sections 162 and 164 are overlapped, the processing unit 12 controls the display unit 16 to display such as, but not limited to the title, the location, the duration or a combination of the overlapped sections 162 and 164 and the overlapped time interval of the sections 162 and 164 such that the user can perceive.

In another example, when the event corresponding to the section 164 occurs, the processing unit 12 controls the display unit 16 to display the content of the event corresponding to the section 164 such that the user can perceive. When the event corresponding to the section 164 is about to occur after an hour, the processing unit 12 controls the display unit 16 to display not only the content of the event corresponding to the section 164, but also the difference of the time between the current time and the occurrence time of the event. When the geometrical spot of the event corresponding to the section 164 is within 1 kilometer from the location of the wearable electronic device 1, the processing unit 12 controls the display unit 16 to display not only the content of the event corresponding to the section 164, but also the difference of the distance between the location of the wearable electronic device 1 and the position of the event.

As a result, the intimating signal 13 can be generated in various ways, and different kinds of intimating signals 13 can be generated in different combinations. In a practical application, when the processing unit 12 determines the time meets a predetermined time prior to the occurrence of one of the events, such as the time of PM 6:00, Sep. 26, 2015 prior to an hour of the sports game mentioned above, the intimating signal 13 is generated by making the section 166 blinks, by generating the intimating frame 168 that displays a reminder message such as, but not limited to a count down timer to the occurrence of the event, by generating the intimating frame 168 that displays a time information of the upcoming event or a combination of the above.

It is appreciated that in an embodiment, the processing unit 12 can also receive command from such as, but not limited to a touch input (not illustrated) from the display unit 16 or a physical button (not illustrated) disposed on the wearable electronic device 1 to control the display unit 16 to display the information of the events mentioned above.

Figure 2B:
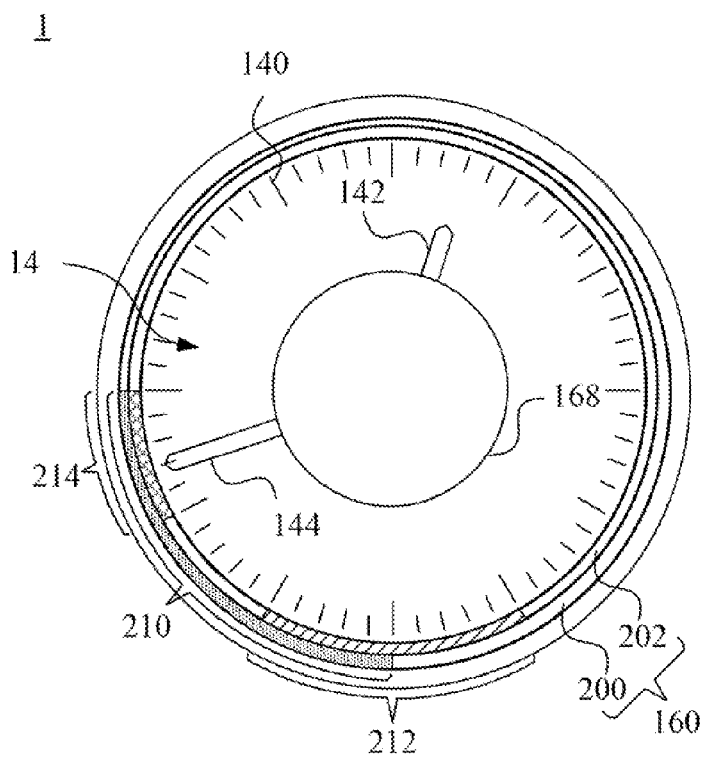
FIG. 2B is a three dimensional diagram of the wearable electronic device in another embodiment of the present invention.

Reference is now made to FIG. 2B. FIG. 2B is a three dimensional diagram of the wearable electronic device 1 in another embodiment of the present invention.

In the present embodiment, the color bar 160 includes two concentric rings 200 and 202. When there are a first event, a second event and a third event each having a duration of time from PM 6:00 to PM 9:00, from PM 5:00 to PM 7:00 and from PM 8:00 to PM 9:00, both the durations of the second event and the third event are overlapped with the first event. As a result, the section 210 corresponding to the duration of the first event and the sections 212 and 214 corresponding to the duration of the second and the third events are displayed on different rings 200 and 202 of the color bar 160. For example, the section 210 is displayed on the outer ring 200, and the sections 212 and 214 are displayed on the inner ring 202.

Figure 3:
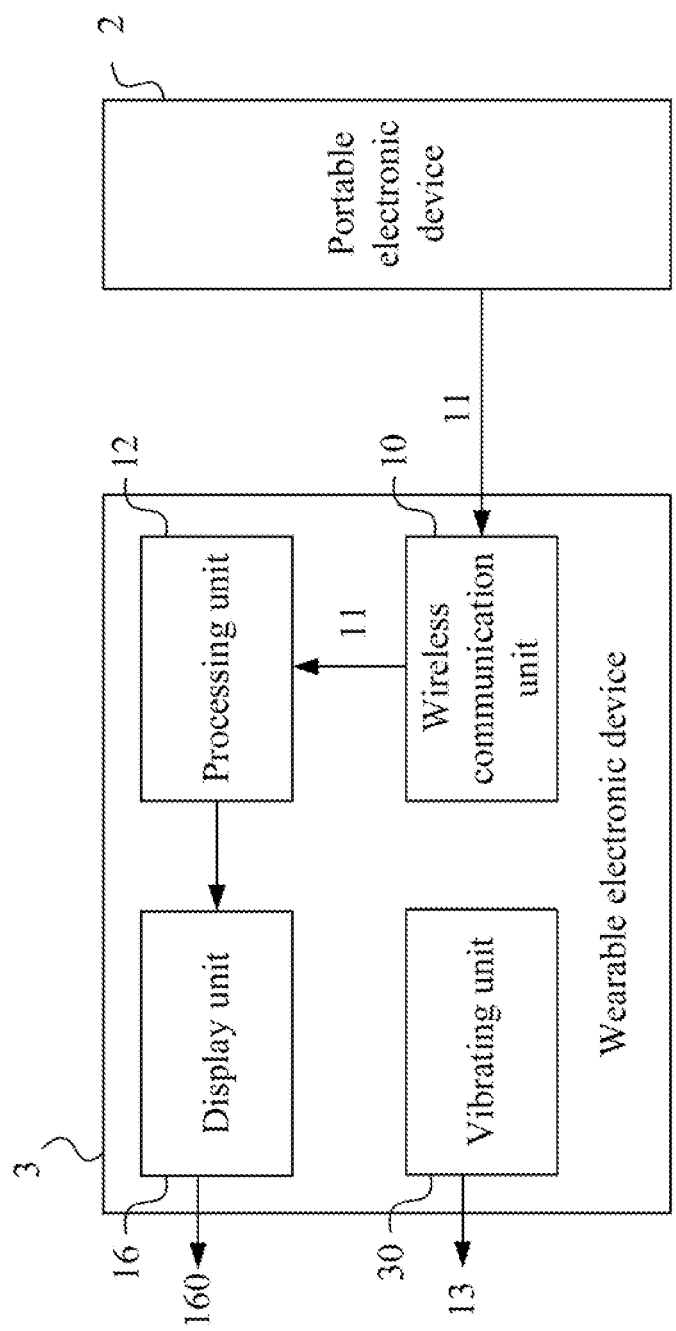
FIG. 3 is another block diagram of a wearable electronic device and a portable electronic device in an embodiment of the present invention.

Reference is now made to FIG. 3. FIG. 3 is another block diagram of a wearable electronic device 3 and a portable electronic device 2 in an embodiment of the present invention. In the present embodiment, besides the components identical to those illustrated in FIG. 1, such as the wireless communication unit 10, the processing unit 12 and the display unit 16, the wearable electronic device 3 further includes a vibrating unit 30.

In a third embodiment, the processing unit 12 controls the vibrating unit 30 to vibrate to generate the intimating signal 13.

For example, when the sections 162 and 164 are overlapped, the processing unit 12 controls vibrating unit 30 to vibrate to generate the intimating signal 13. In another example, when the event corresponding to the section 164 occurs, the event corresponding to the section 164 is about to occur after an hour, or the geometrical spot of the event corresponding to the section 164 is within 1 kilometer from the location of the wearable electronic device 1, the processing unit 12 controls the vibrating unit 30 to vibrate to generate the intimating signal 13.

In an embodiment, when the time or the position to the event is closer, the processing unit 12 may increase the vibration frequency of the vibrating unit 30 to perform a further intimation.

Figure 4:
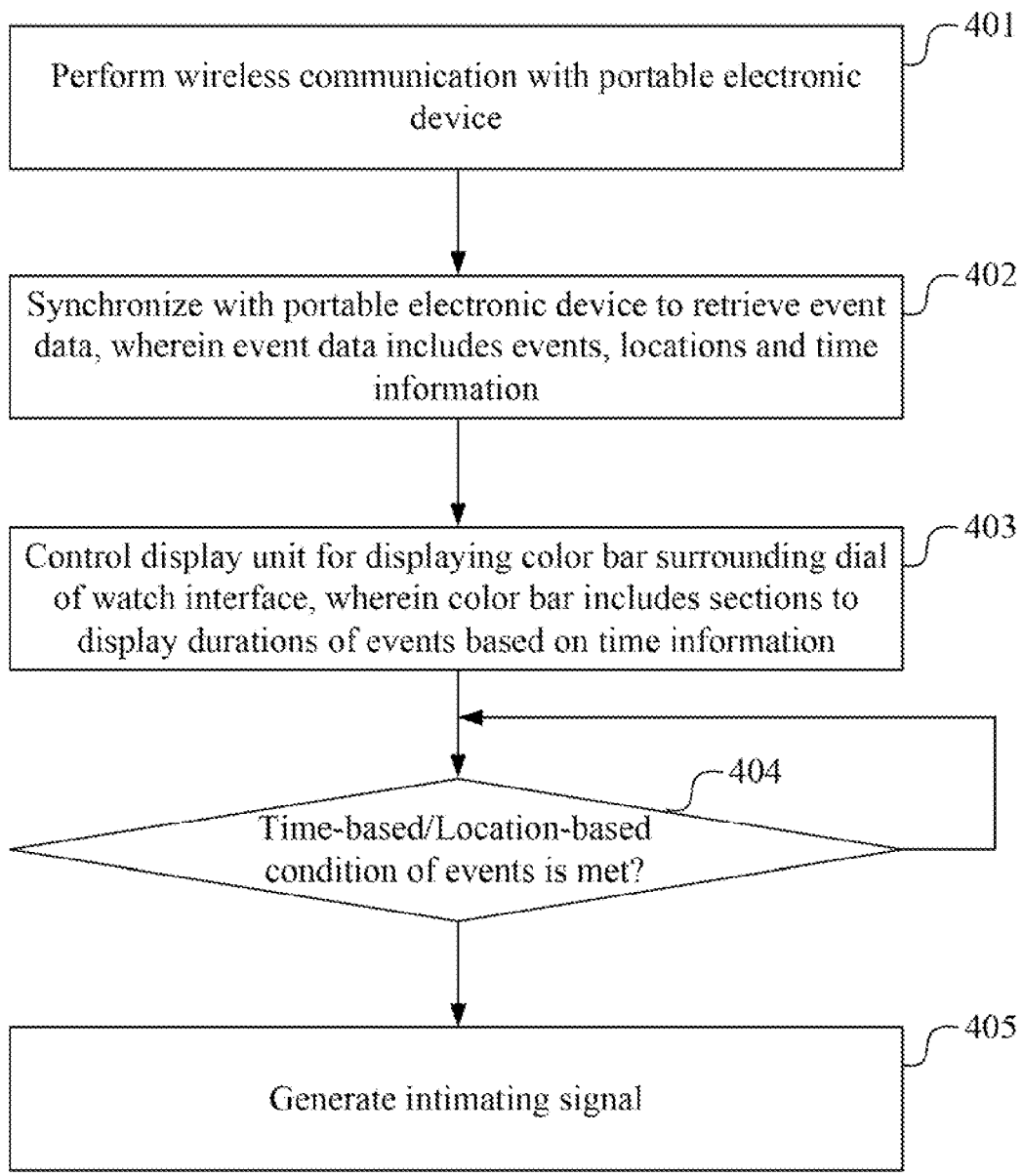
FIG. 4 is a flow chart of an event-intimating method in an embodiment of the present invention.

Reference is now made to FIG. 4. FIG. 4 is a flow chart of an event-intimating method 400 in an embodiment of the present invention. The event-intimating method 400 can be used in the wearable electronic device 1 or 3 illustrated in FIG. 1 and FIG. 3 respectively. The event-intimating method 400 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 401, the wireless communication with the portable electronic device 2 is performed by the wireless communication unit 10.

In step 402, the portable electronic device 2 is synchronized with by the processing unit 12 to retrieve event data 11 from the portable electronic device 2 through the wireless communication unit 10, wherein the event data includes the events, the locations and the time information corresponding to the events.

In step 403, the display unit 16 is controlled for displaying a color bar 160 surrounding the dial 140 of the watch interface 14 by the processing unit 12, wherein the color bar 160 includes the sections 162, 164 and 166 to display durations of the events based on the time information.

In step 404, the processing unit 12 determines that whether the time-based condition or the location-based condition of the events is met. When the time-based condition or the location-based condition of the events is not met, the flow goes back to step 404 to keep the determination step.

When the time-based condition or the location-based condition of the events is met, the intimating signal 13 is generated under the control of the processing unit 12 in step 405.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wearable electronic device comprising:
   a wireless communication unit for performing wireless communication with a portable electronic device;
   a processing unit for synchronizing with the portable electronic device to retrieve event data from the portable electronic device through the wireless communication unit, wherein the event data comprises a plurality of events and time information corresponding to the events;
   a watch interface having a dial; and
   a display unit;
   wherein the processing unit controls the display unit to display a color bar surrounding the dial, wherein the color bar comprises a plurality of sections to display durations of the events based on the time information, and when the processing unit determines that a time-based condition or a location-based condition of the events is met, an intimating signal is generated under the control of the processing unit;
   wherein when the processing unit determines that the durations of the events are overlapped, the processing unit controls the display unit to make a portion of the color bar that corresponds to the overlapped durations blink to generate the intimating signal.

2. The wearable electronic device of claim 1, wherein the time-based condition is met when the processing unit determines that a current time meets an occurrence of one of the events.

3. The wearable electronic device of claim 1, wherein the time-based condition is met when the processing unit determines that a current time meets a predetermined time prior to the occurrence of one of the events.

4. The wearable electronic device of claim 1, wherein the location-based condition is met when the processing unit determines that a location of the wearable electronic device is within a predetermined distance from a geometrical spot related to on of the event or a combination of the above, an intimating signal is generated under the control of the processing unit.

5. The wearable electronic device of claim 1, wherein the color bar comprises a plurality of concentric rings, when the durations of the events corresponding to the sections are overlapped, the sections are displayed on different rings of the color bar.

6. The wearable electronic device of claim 1, wherein the processing unit controls the display unit to display an intimating frame to generate the intimating signal.

7. The wearable electronic device of claim 6, wherein the intimating frame comprises a content, a name, a duration, a start time, an end time, a location or a combination of the above of the events.

8. The wearable electronic device of claim 1, further comprising a vibrating unit, and the processing unit controls the vibrating unit to vibrate to generate the intimating signal.

9. The wearable electronic device of claim 1, wherein the events is a calendar event, a navigation event or a combination of the above.

10. An event-intimating method used in a wearable electronic device, wherein the event intimating method comprises:
- performing wireless communication with a portable electronic device by a wireless communication unit;
- synchronizing with the portable electronic device by a processing unit to retrieve event data from the portable electronic device through the wireless communication unit, wherein the event data comprises a plurality of events and time information corresponding to the events;
- controlling a display unit for displaying a color bar surrounding a dial of a watch interface by the processing unit, wherein the color bar comprises a plurality of sections to display durations of the events based on the time information;
- determining that a time-based condition or a location-based condition of the events is met by the processing unit; and
- generating an intimating signal under the control of the processing unit by controlling the display unit to make a portion of the color bar that corresponds to the overlapped durations blink when the processing unit determines that the durations of the events are overlapped.

11. The event-intimating method of claim 10, wherein the time-based condition is met when the processing unit determines that a current time meets an occurrence of one of the events.

12. The event-intimating method of claim 10, wherein the time-based condition is met when the processing unit determines that a current time meets a predetermined time prior to the occurrence of one of the events.

13. The event-intimating method of claim 10, wherein the location-based condition is met when the processing unit determines that a location of the wearable electronic device is within a predetermined distance from a geometrical spot related to on of the event or a combination of the above, an intimating signal is generated under the control of the processing unit.

14. The event-intimating method of claim 10, wherein the color bar comprises a plurality of concentric rings, the method further comprising:
- displaying the sections on different rings of the color bar when the durations of the events corresponding to the sections are overlapped.

15. The event-intimating method of claim 10, further comprising generating the intimating signal by controlling the display unit to display an intimating frame by the processing unit.

16. The event-intimating method of claim 15, wherein the intimating frame comprises a content, a name, a duration, a start time, an end time, a location or a combination of the above of the events.

17. The event-intimating method of claim 10, wherein the wearable electronic device further comprises a vibrating unit, and the event-intimating method further comprises controlling the vibrating unit to vibrate by the processing unit.

18. The event-intimating method of claim 10, wherein the events is a calendar event, a navigation event or a combination of the above.

* * * * *